March 6, 1951 E. R. SHENK 2,543,874

ELECTRONIC DISTRIBUTOR

Filed Sept. 25, 1946 3 Sheets-Sheet 1

INVENTOR.
EUGENE R. SHENK
BY H. G. Grover
HIS ATTORNEY

March 6, 1951 E. R. SHENK 2,543,874

ELECTRONIC DISTRIBUTOR

Filed Sept. 25, 1946 3 Sheets-Sheet 2

INVENTOR.
EUGENE R. SHENK

BY H. S. Grover

HIS ATTORNEY

March 6, 1951 E. R. SHENK 2,543,874

ELECTRONIC DISTRIBUTOR

Filed Sept. 25, 1946 3 Sheets-Sheet 3

*INVENTOR.*
EUGENE R. SHENK
*BY* H. S. Grover
HIS ATTORNEY

Patented Mar. 6, 1951

2,543,874

UNITED STATES PATENT OFFICE 2,543,874

ELECTRONIC DISTRIBUTOR

Eugene R. Shenk, Brooklyn, N. Y., assignor to Radio Corporation of America, a corporation of Delaware Application September 25, 1946, Serial No. 699,191

14 Claims. (Cl. 178—53.1)

This invention relates to electronic distributors and more particularly to a device for use in connection with multiplex telegraph signaling systems where it may be found advantageous to substitute electronic distribution means for a mechanical type distributor. It is also useful in simplex start-stop systems.

As is well known in the art, distributors are commonly used for sequentially selecting individual circuits or lines, and connecting them to a common circuit, as is required at a multiplex transmitting station. Alternatively, a distributor may be used for separating the elements of a composite signal train and allocating them successively to individual circuits or lines, thus meeting a well known requirement in multiplex telegraphy for channel or code element distribution at a receiving station.

This invention is directed to improvements in electronic distributors for selecting and distributing signals or circuits, so as to operate multiplex printing telegraph equipment, at a receiving station, or, on the other hand, to collect signals from a multiplicity of signal train sources and to apply them consecutively to a common transmitting channel.

A principal object of my invention is to provide an electronic distributor the function of which is equivalent to that of a mechanical distributor where either one might be used in sequentially selecting individual circuits and connecting them to a common circuit or a line.

Another object is to provide an electronic circuit which is capable of connecting a common source of signals sequentially to each of a plurality of individual circuits or lines.

Still another object is to provide an electronic transmitting and/or receiving distributor having adjustable time constant parameters such that it may be closely synchronized for operation with the transmission rate of a transmitted or received train of code signals.

Again it is an object to provide means in an electronic distributor for operating a concatenated series of discharge devices one after another at a constant rate.

Once more it is an object to improve the operation of an electronic distributor by the use of a unilaterally conductive element in shunt with a conventional resistor in the grid biasing circuit of a discharge tube.

Figure 1:
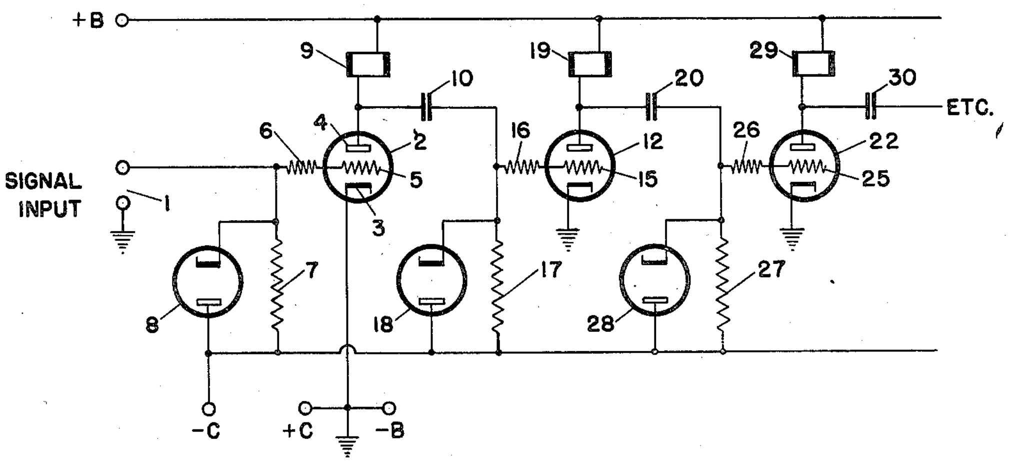
Figure 2:
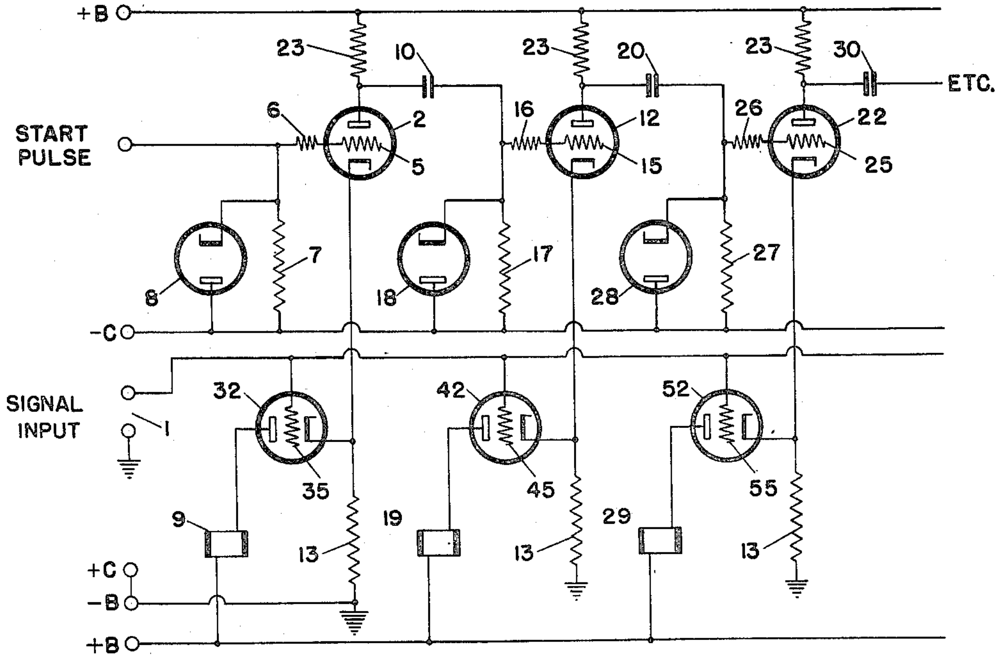
Figure 3:
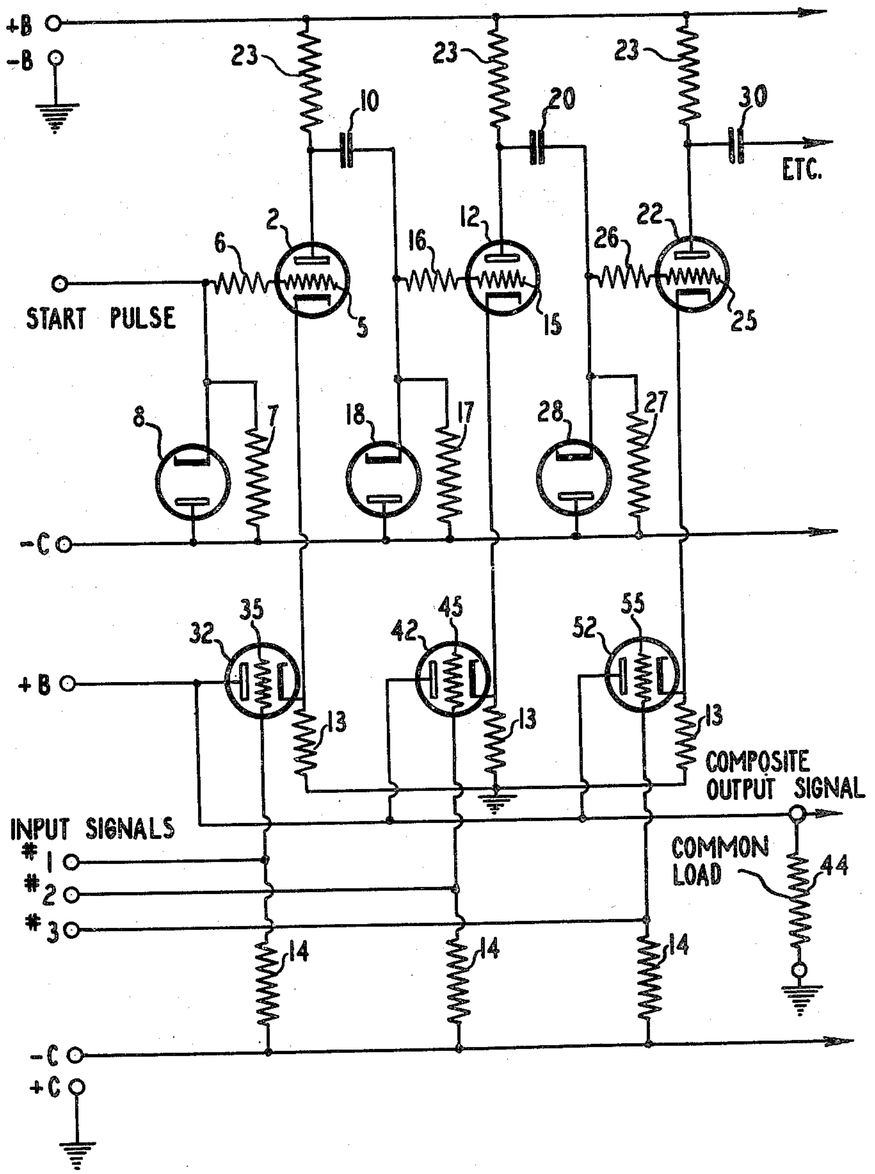
Figure 4:
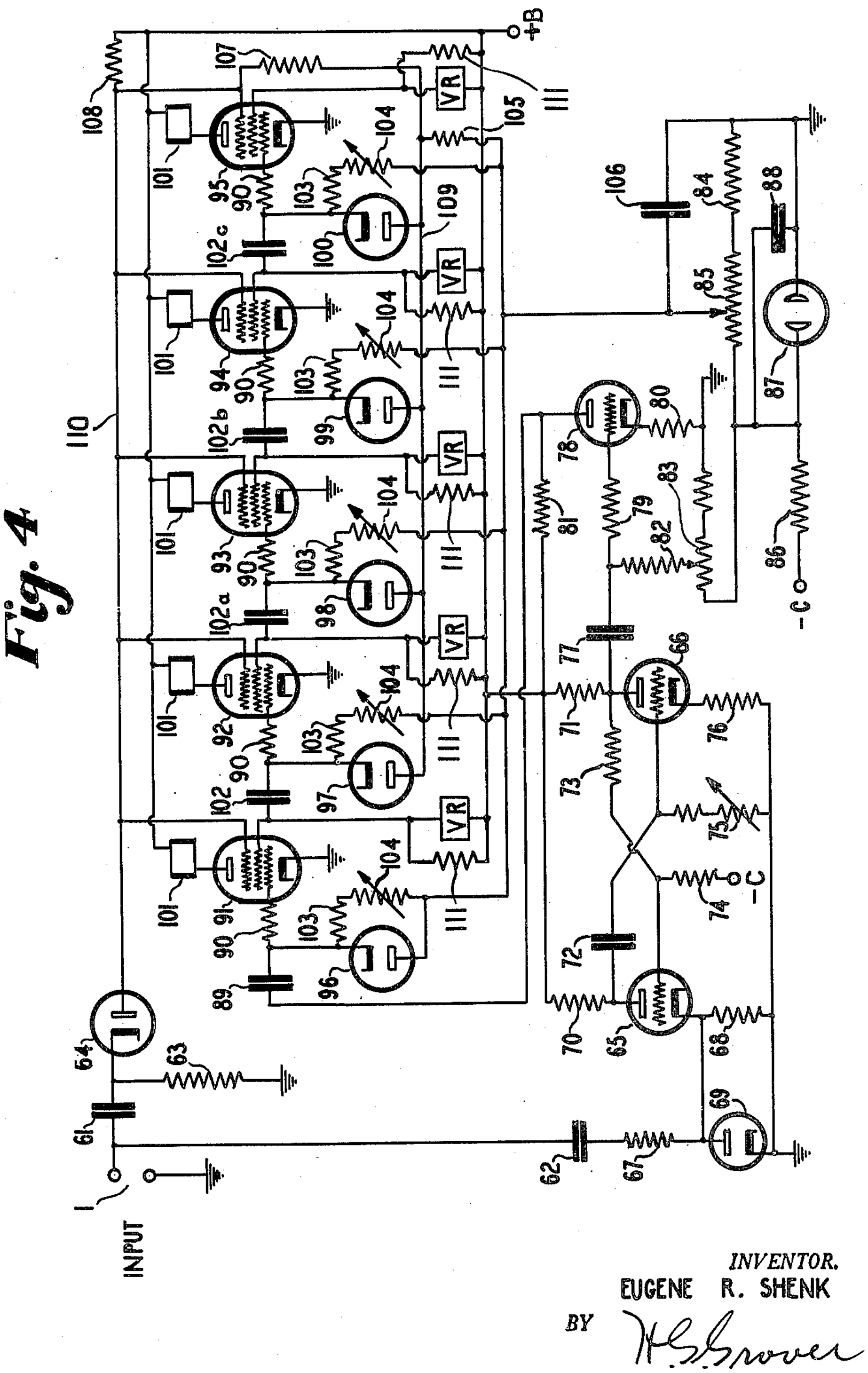

My invention will now be described in more detail reference being made to the accompanying drawings, in which, Fig. 1 shows diagrammatically a concatenated arrangement of discharge tubes which may be sequentially operated;

Fig. 2 shows a modification in which the concatenated discharge tubes to be successively operated at a fixed cadence by means of time constant circuits are made to control each of another set of discharge tubes which function as "slave" tubes and are used for purposes of distributing signals into a suitable utilization device;

Fig. 3 shows another modification wherein a plurality of input circuits are caused to feed signals to the grids of different tubes which are sequentially controlled in such manner that a composite output signal may be directed into a common load; and Fig. 4 shows a complete circuit diagram for an electronic distributor to be used at a receiving station where it is desired to distribute a train of multiplex signals in such manner that each individual signal is applied to its appropriate communication channel.

Referring first to Fig. 1, I show therein an arrangement of triode discharge tubes 2, 12 and 22. Each of these tubes possesses a cathode 3, an anode 4 and a control grid 5, 15 or 25. The diagram, while it shows only three discharge tubes, may be considered as representative of a distributor having any number of tubes therein, so that the distributor may correspond to that of a mechanical distributor having any desired number of segments.

An input circuit for tube 2 comprises two resistors 6 and 7, connected between the grid 5 and the negative terminal of a direct current source, the positive terminal of which is grounded. These terminals are labeled —C+C. Another direct current source having its minus terminal grounded is indicated by the references —B and +B. The +B terminal is connected in parallel to each of several magnet windings 9, 19 and 29, representing different utilization devices which are to be controlled by the input signals upon distribution thereof.

The input signal terminals 1 are connected respectively to a junction between resistors 6 and 7 and to ground. In shunt with resistor 7, I preferably dispose a rectifying device 8 of any suitable type, such as a diode discharge tube, a copper oxide, or selenium rectifier.

This uni-directional conducting device is suitably poled so as to short out the resistor 7 for voltages of negative polarity impressed upon the grid 5.

The output circuit of tube 2 extends from its cathode 3 through the B-potential supply, thence through the winding of the magnet 9 and to the anode 4. This anode is connected through a capacitor 10 and a resistor 17 to the —C potential terminal. Resistor 17 is shunted by another rectifier 18. The junction between resistor 17 and capacitor 10 is connected through a resistor 16 to the grid 15 of the second triode tube 2 of the concatenation. This tube possesses input and output circuits similar to that of tube 2.

Similarly the third tube 22 of the concatenation possesses input and output circuits similar to those previously described. The capacitor 30 is, however, indicated as leading to the input circuit of a fourth tube not shown.

In the operation of the circuit arrangement shown in Fig. 1, let it be assumed that a positive voltage pulse is applied to terminal 1.

If the amplitude of this pulse is sufficiently great to overcome the blocking bias of the C-potential source, then the grid-cathode voltage of tube 1 will rise to zero or slightly positive. The limiting action of the resistor 6 in conjunction with the relatively small grid cathode resistance of the tube when the grid is positive prevents the grid voltage from going positive to any important extent. When tube 2 becomes conductive, its anode-cathode voltage drops below that of the +B potential by an amount representing the voltage drop through the winding of the magnet 9. Consequently, capacitor 10 is forced to lower its charge from its previous value, to wit, the difference of potential between the +B terminal and the −C terminal, to a new value representing substantially the potential drop across the space path of tube 2, plus the voltage of the C-potential source. Capacitor 10 is able to discharge quickly by virtue of the presence of the rectifier 18 in shunt with resistor 17.

When the positive voltage step or pulse is removed from the grid of tube 2, its anode voltage rises to that of the +B terminal. Now capacitor 10 must increase its charge to its original value. The rectifier 18 does not shunt resistor 17 effectively during this charging cycle. However, the internal grid-cathode resistance of tube 12 becomes very small, so that resister 16 is effectively connected in parallel with resistor 17. Accordingly, the resistance associated with capacitor 10 on charge is that of the winding 9, plus the parallel combination of resistors 16 and 17. Tube 12 is maintained conductive for a period of time which depends upon the characteristics of tubes 2 and 12, the supply voltages and the circuit parameters. While tube 12 is conductive capacitor 20 discharges in a similar manner to that previously described for capacitor 10. Finally the charging current of capacitor 10 flowing in the grid circuit of tube 12 becomes too small to maintain this tube conductive, then tube 12 ceases to pass plate current, and its anode voltage rises to that of the +B terminal. Also capacitor 20 begins to charge to its original value thereby causing tube 22 to conduct. Now capacitor 30 discharges and the chain of events continues as previously described. Thus one positive pulse applied to tube 2 results in each tube of the chain becoming conductive sequentially. Each tube conducts for a time which depends upon the factors previously mentioned, and these conductive times may be equal to or different from one another.

As many tubes as desired may be connected in cascade as indicated, and the pulses will travel down the entire line. If the tube at the far end of the line is not connected to any other, then the system will operate as a "start-stop" commutator. The application of a start pulse causes each tube in the line to conduct in turn, the operation ceasing when the last tube in the chain is extinguished.

Control voltages or currents can be obtained from the circuit of Fig. 1 which, together with the voltages or currents to be distributed, permit or prevent the flow of current in a second vacuum tube or other mixing device, according to any of the standard methods of mixing signals.

By way of example only, the arrangement of Fig. 2 is illustrative of a receiving distributor. The composite signal—for instance, a printer telegraph signal—is supplied at terminals 1. The start pulse, which may be included in the incoming signal, is applied at terminal 31. Normally grids 35, 45, 55 etc. operate at zero bias. However, when tube 2 conducts, its plate current flows through resistor 13 and biases tube 32 below plate current cutoff. Consequently, no plate current flows through the magnet 9 unless the composite input signal is positive at this same time. Next, tube 12 will conduct and tube 42 will be rendered non-conducting, unless the composite input signal is positive at that time. Thus it is seen that if the composite input signal is zero when tube 2 conducts, no current will flow in tube 32 nor therefore in magnet 9. However, if the composite input signal is positive when tube 2 conducts, then magnet 9 will be energized. The circuit operates in exactly the same way as concerns cooperation of components 15, 42 and 19, and also the cooperation of components 25, 52 and 29. While I have shown the elements 9, 19 and 29 as the coils of magnets or relays, it will be understood that any other utilization devices may be substituted if desired. For example indicator lamps or audibly responsive devices may be used.

The circuit of Fig. 3 operates in an analogous way except that three (or $n$) separate signals are combined into a single composite output signal. This is the general type of distributor that would be used at the transmitting terminal.

Referring now to Fig. 4, the circuit arrangement therein shown constitutes an electronic distributor which may be substituted for a mechanical rotary distributor at the receiving terminal of a printing telegraph system operating on a "start-stop" basis. Certain similarities will be observed between this circuit and those previously described in this specification.

A trigger circuit comprising triode tubes 65 and 66 is arranged to respond only to the start pulse in a composite signal train. Its function is to condition the first tube 91 of the series 91 to 95 inclusive to accept a signal pulse representing a code element. But this function is performed through an intervening tube stage 78.

The signal potentials, including the start pulse, are applied to terminals 1. The start pulse is always negative, and because it is applied through a capacitor 62 and resistor 67 to the cathode of tube 65 this tube is rendered conductive. Prior to the start pulse tube 65 was held non-conductive by a negative bias applied from a −C source terminal through resistor 74 to the tube's control grid.

The circuit components 66, 68 and 70 to 76 inclusive for the trigger tubes are so chosen that they will hold the tripped state (tube 65 conducting and tube 66 non-conducting for a predetermined period which is substantially equal to the transmission time of the code signal elements of the start-stop train.

At the end of said predetermined period the trigger circuit restores itself to the normal state, thus becoming responsive to the next succeeding start pulse. But while tube 65 is conductive a considerable portion of its space current flows through the diode tube 69, which shunts the cathode resistor 68, thus developing so low a resistance in the diode compared with that of resistor 68 as to render the tube 65 unresponsive to control by code pulses of the signal train. And after tube 65 again becomes non-conductive the diode 69 in its cathode circuit draws substantially no current and therefore constitutes a very high resistance. Hence the relatively high impedance of resistor 68 provides the means for subjecting the cathode of tube 65 to start-pulse control.

So the start pulse trips the trigger circuit, causing its tube 66 to become non-conductive. Its plate potential rises substantially to that of the +B source terminal, thus delivering a pulse across capacitor 77 and through resistance elements 82 and 83 to ground. To that circuit is connected a grid resistor 79 leading to the control grid in tube 78.

The duration of the conductive period for tube 78 is adjustable. It is determined by the time constant characteristics of capacitor 77, resistor 82, potentiometer 83 and the −C voltage connected through resistor 86. The conductive period can be adjusted by properly setting the potentiometer tap to which resistor 82 is connected. The potentiometer 83 thus provides a suitable threshold bias for tube 78.

The cascade arrangement of pentode discharge tubes 91 to 95 inclusive has its circuit parameters so chosen as to enable each tube to function in succession and to translate successive code elements of a start-stop signal. The cadence of progression is fixed in accordance with the rate of transmission at which the start-stop code signal is to be received.

All of the pentode tubes 91 to 95 inclusive are normally biased to cut-off. The grid biasing potential is obtained from a tap on potentiometer 85 which is series-connected between resistor 86 leading to the −C source terminal and resistor 84 leading to ground, the +C source terminal being understood to be grounded. This biasing potential is separately applied to the control grids of the pentode tubes 91 to 95 inclusive through parallel connections each of which includes resistors 104, 103 and 90, resistor 104 being of adjustable value. Capacitor 106 provides an A. C. path to ground.

The tap on potentiometer 85, besides serving to provide a suitable control grid bias for tubes 91—95 is also connected through a resistor 105 to a conductor 109 to which the anodes of diode tubes 97, 98, 99 and 100 are parallel-connected. Conductors 109 and 110 are interconnected through a resistor 107, and conductor 110 is connected to each of the suppressor grids in the pentode tubes. Furthermore, a resistor 108 is connected between the +B terminal and conductor 110. A voltage divider path is thus provided across the direct current source terminals, this path extending (from +B to ground) through resistors 108, 107, 105, 85 and 84; also (from ground to −C) through resistors 84, 85 and 86.

Voltage regulation of the grid biasing circuit is preferably obtained by the use of a gaseous glow tube 87 in shunt with resistors 84 and 85. These resistors are also shunted by an ordinary by-pass condenser 88.

The screen grids of the pentode tubes are connected to the +B terminal through separate resistors 111. In shunt with each of these resistors is a voltage regulator VR of suitable type. Preferably the regulator VR comprises two series-connected gaseous glow tubes the junction between which may be connected to a tap on resistor 111.

The glow lamps for screen voltage regulation need not, however, be considered essential, since tubes having more grids than a pentode might be used. An additional grid or grids would shield the screen grid and make its current essentially independent of plate current flow.

Now to resume the explanation of how the circuit operates:

The response of the trigger circuit to a start pulse drives tube 78 conductive. The lowered space path impedance of tube 78 enables capacitor 89 to be discharged and the discharge rate is accelerated by means of the diode tube 96 which is connected in shunt with one of the highly resistive circuit paths 103—104.

The very brief discharge period of capacitor 89 is followed immediately by a charging period during which tube 91 is rendered conductive between its cathode and screen grid. At this time, therefore, tube 91 is conditioned to accept the first code pulse in the signal train.

If the pulse is negative, then the diode tube 64 draws current through capacitor 61 in addition to what normally flows through resistor 63. This drives the suppressor grids in tubes 91—95 in a negative direction and they draw substantially no plate current. If, however, the signal pulse is positive, then the diode tube 64 becomes blocked and, since tube 91 alone is conductive of screen current, it will respond to the rise of suppressor grid potential toward ground or slightly above. Hence tube 91 is caused to draw plate current. In this way a relay or magnet 101 in the anode circuit of tube 91 may be energized and caused to perform any desired responsive function, such as to actuate a code element selector in a printer.

Whether or not the conductive state is established in tube 91 by the above described process, it will be apparent that the starting pulse alone is sufficient to establish conductivity between the cathode and the screen grid in that tube. This lowers the potential of the screen grid and causes a pulse to be applied through capacitor 102 and through the parallel paths which include the diode tube 97 and the associated resistive elements 103 and 104. The magnitude of the electron current that flows to the screen grid in tube 91 depends upon whether or not the suppressor electrode permits electrons to flow to the plate. Consequently, it is important to provide the voltage regulator means VR as previously described for maintaining the screen grid voltage within suitable tolerances. As a result of voltage regulation any new charge acquired by the capacitor 102 coupling the screen grid of tube 91 to the control grid of tube 92 is suitably regulated for rendering this action independent of the marking and spacing conditions of code signal control.

From the description in the foregoing paragraph, it will be observed that since the conducting time of tube 92 depends upon the magnitude of the change of charge on capacitor 102, the net result is to produce sequential action of tubes 91 and 92 in accordance with a predetermined cadence which is suited to the rate of transmission of the code signal elements.

The cascade arrangement of tubes 91, 92, 93, 94 and 95 will be clearly understood to be such as to render these tubes successively responsive to each of the elements of a code signal. Each tube is prepared for such response by the operation of quickly discharging and slowly re-charging the condenser 102 which is coupled to its control grid. Then it is conditioned for response to a code signal element. Its screen grid potential causes the next tube to be conditioned for response to a code signal element and so on throughout the cascade arrangement. The diode tubes 96, 97, 98, 99 and 100 not only help to provide a low resistance in the discharge path of their associated capacitors 102 and the like but these diode tubes each provide a path for coupling a negative pulse into the common suppressor grid circuit at the time when the appropriate one of the tubes 91—95 becomes conductive.

One desirable result to be obtained by keying the negative pulses of the code signal elements into the suppressor grid circuits is to prevent a marking pulse, which may be prolonged, due to well-known signal multi-path conditions, from registering a marking condition in the next succeeding channel. The result corresponds with what is accomplished in a mechanical distributor by applying a portion of the leading edge of each signal either to an insulated segment or to an insulating portion of the ring which is traversed by the rotary distributor brushes. In the present invention the negative pulses traverse the diode tubes 96—100 and thence they are directed through a path which includes a resistor 105 and a capacitor 106 on the other side of which is a ground connection. Resistor 105 is so selected as to be small in value in comparison with the resistance in the charge path of capacitor 102. This explains how capacitor 102 can discharge faster than it charges; a desirable feature. The ratio of charge to discharge resistance in the circuit of capacitor 102 and the magnitude of the bias voltage in the grid circuit of tube 92 is to be so chosen as to make the positive pulse coupled into the suppressor grid circuit of tube 92 ineffective for a short time preferably of the order of 30% of the time occupied by the incoming code signal element.

From the foregoing description it will be observed that the operation is one in which successive code signals may be translated or distributed in the same manner as is accomplished by means of a rotary distributor the brush of which has a homing position where it is stopped after each cyclic excursion over the commutator segments and is again started for translation of a succeeding code signal combination.

To those skilled in the art, certain modifications of my invention other than those herein above described will readily suggest themselves. For example, series resistance and shunt inductance may be substituted for the series capacitance and shunt resistance coupling means between the output electrode of one tube and the input electrode of the next tube in the cascade arrangement. In place of relay magnets 101 and the like, it is, of course, apparent that other utilization devices may be placed in the output circuits of the tubes 91—95. These relay coils are therefore to be understood as merely one example of utilization.

Then again it is apparent that the number of sequentially operable tubes such as tubes 91 to 95 inclusive may be increased or decreased in order to distribute whatever number of code elements, there may be in a simplex or multiplex signal train.

I claim:

1. An electronic distributor for use in allocating successive code elements of a train of signals to different responsive devices, said distributor comprising a plurality of discharge tubes each having a control grid and each having its space path connected in series with a respective one of said responsive devices and with a common source of operating potential, a concatenated series of discharge tubes constituting individual control means for sequentially applying cut-off bias to each of the first said tubes, means for causing each of the tubes of said concatenated series to be normally biased to cut-off, each of the tubes of said concatenated series having an input circuit with predetermined asymmetrical time-constant characteristics and an output circuit, a capacitor coupling each output circuit to the input circuit of a succeeding tube up to the final tube of the series, a signal input circuit connected in parallel to the control grids of all the tubes in the group first mentioned, whereby each of said tubes is caused to be conductive whenever a positive signal pulse is applied to its grid during the application of cut-off bias therefrom by the operation of the tubes of said concatenated series.

2. An electronic distributor comprising a plurality of cascaded pentode discharge tubes each having a cathode, a first grid, a screen grid, a suppressor grid and an anode a resistive input circuit connected between cathode and first grid of each tube, an output circuit connected individually through a respective one of a series of responsive devices, a unidirectional conductor shunting a portion of each input circuit and offering a high impedance to the flow of electrons toward said first grid, means to apply operating potentials to said tube, a capacitor coupling the screen grid of each tube to the input circuit of a following tube in the cascade arrangement, a conductor fed with a composite signal train and having parallel branches connected to the suppressor grids in each of said pentode tubes, means normally biasing said tubes to cut-off, means for applying a pulse of positive polarity to the first grid in the first tube to produce a conductive state therein from the cathode to the screen grid, each said capacitor being thereupon rendered effective in producing similar conductive states in the other tubes consecutively, whereby said responsive devices are progressively subjected to control by the code elements of said signal train.

3. A distributor according to claim 2 and including a tripping circuit in said means for applying the pulse of positive polarity to the first grid of the first tube, said tripping circuit being of the type wherein two discharge devices are rendered conductive at substantially mutually exclusive times and in dependence one upon the other and wherein said circuit possesses time-constant parameters at which it restores itself to a stable state after a predetermined time interval following its tripping.

4. A distributor according to claim 2 and including a trigger circuit and a phase inverter stage in said means for applying the pulse of positive polarity to the first grid in the first tube to initiate sequential operation of said discharge tubes after the lapse of a certain time interval following the reception of the start pulse.

5. A distributor according to claim 2 wherein said means to apply operating potentials include sources of direct potential having their terminals suitably connected to the electrodes of said tubes, and voltage regulating means in circuit between each of the screen grids of said tubes and the most positive of the source terminals.

6. An electronic distributor comprising a plurality of cascaded pentode discharge tubes each having a grounded cathode, an anode, a first grid, a screen grid and a suppressor grid, an input circuit and an output circuit for each tube, a direct current source having a ground connection intermediate its positive and negative terminals, the negative terminal being resistively connected to each of said input circuits for normally biasing said tubes to cut-off, and the positive terminal serving to supply anode and screen grid potentials to said tubes, means including a capacitor coupling the screen grid of each tube to the input circuit of the next tube in the cascaded series whereby said tubes are caused to be progressively activated, a circuit receptive of start pulses coupled to the input circuit of the first tube in the cascade, another circuit receptive of signal pulses, this circuit being connected in parallel to each of said suppressor grids and serving to control the flow of current in said output circuits when said tubes are rendered conductive by removal of the cut-off bias from their input circuits, and a responsive device constituting a useful load in each of said output circuits.

7. A distributor according to claim 6 and having means including a unidirectional conductor in said circuit which is receptive of signal pulses, said means serving to block the application of positive pulses to said suppressor grids.

8. An electronic distributor of the class described comprising a trigger circuit subject to control by each start pulse which initiates a character code signal composed of a fixed number of marking and spacing code elements as used in a start-stop printer system, a plurality of pentode discharge tubes each having a grounded cathode, an anode, a first grid, a screen grid and a suppressor grid, an input circuit and an output circuit for each tube, a direct current source having a ground connection intermediate its positive and negative terminals, the negative terminal being resistively connected to each of said input circuits for normally biasing said tubes to cut-off, and the positive terminal serving to supply anode potential and screen grid potential to said tubes, means including a capacitor coupling the screen grid of each tube to the input circuit of the next tube in the cascaded series whereby said tubes are caused to be progressively activated, means operative under control of said trigger circuit to produce a delayed activation of the first said pentode discharge tube for response to the first of said code elements in each character code signal, means for varying the potential of said suppressor grids in accordance with the marking and spacing polarities of said code elements, and a responsive device in each output circuit through which anode potential flows when the entire space path of the appropriate tube is rendered conductive in response to simultaneous control thereof by said screen grid-to-input circuit coupling means and by an effective signal pulse impressed upon said suppressor grid.

9. An electronic distributor comprising a plurality of electron discharge systems arranged to define a plurality of primary and secondary space charge path portions, there being a grid electrode arranged in each of said space charge path portions for control thereof, a resistive input circuit connected to the grid electrodes of each primary space charge path portion, a uni-directional conductor shunting a portion of each input circuit and offering a high impedance to the flow of electrons toward said grid electrodes, means coupling each of said secondary space charge path portions individually in circuit with a respective one of a series of responsive devices, a capacitor connecting the output of each primary space charge path portion directly to the following input circuit in cascade arrangement, means to apply a train of positive signal elements to be allocated to said responsive devices to the grid electrodes of the secondary space charge path portions, means to apply operating potentials to said electron discharge systems including potentials normally biasing said primary space charge path portions to cut-off, each of said primary space charge path portions being coupled to a secondary space charge path portion to control electron flow therein, and means for applying a start pulse of positive polarity to the grid electrode in the primary space charge path portion of the first electron discharge system in said cascade arrangement to produce a conductive state therein to block the associated secondary space charge path portion, each of said capacitors being thereupon rendered effective in producing similar conductive states in the other primary discharge path portions consecutively, whereby said responsive devices are progressively subjected to control by the elements of said train of signals.

10. An electronic distributor comprising a plurality of electron discharge systems each having electrodes arranged to define primary and secondary space charge path portions, there being a control grid arranged in each of said space charge path portions, means to apply operating potentials to said electron discharge systems including potentials normally biasing said primary space charge path portions to cut-off, a resistive input circuit connected to the grid electrodes of each primary space charge path portion, a uni-directional conductor shunting a portion of each input circuit and offering a high impedance to the flow of electrons toward said grid electrodes, a capacitor coupling the output electrode of each primary space charge path portion affected by electron flow controlled by said interposed grid electrode directly to the input circuit of a series of primary space charge path portions in cascade arrangement, each of said primary space charge path portions being coupled to a secondary space charge path portion to control electron flow therein, means to apply a train of positive signal elements to the grid electrodes of said secondary space charge path portions, means for applying a pulse of positive polarity of the cascade arrangement to produce a conductive state therein and block the associated secondary space charge path portion, each of said capacitors being thereupon rendered effective in producing similar conductive states consecutively in the succeeding primary space charge path portions in the cascade, and means asymmetrically characterizing the time constants of said capacitor-input circuit coupling means whereby said responsive devices are progressively subjected to control by the elements of said train of signals.

11. An electronic distributor circuit arrangement, including a plurality of cascaded electron tube circuits, each including electron discharge means comprising cathode and other electrodes defining primary and secondary discharge path portions, there being grid electrodes interposed in each of said path portions, individual responsive devices connected to the output electrodes of each of secondary path portions, means to apply a direct potential source having a ground connection intermediate the negative and positive terminals thereof to said cascaded circuits, said negative terminal being resistively connected to the grid electrode of each of said primary path portions normally to block the same and said positive terminal being connected to each of said responsive devices, and a capacitor directly coupling the output of each of said primary path portions to the grid electrode of the succeeding primary path portion in the cascaded series, a circuit receptive of start pulses coupled to the grid electrode of the primary path portion of the first circuit in the cascaded series, whereby said primary path portions are caused to be activated progressively to control the flow of current in the secondary path portion of said circuits to actuate the associated responsive device.

12. An electronic distributor circuit arrangement, including a plurality of cascaded electron discharge tubes each having a grounded cathode and anode electrodes defining an electron discharge path and control electrode means interposed in said discharge path, input and output circuits for each of said tubes, individual responsive devices connected to the anode electrodes of each of said tubes, means to apply a direct potential source having a ground connection intermediate the negative and positive terminals thereof to said cascaded tubes, said negative terminal being resistively connected to the input circuit of each of said tubes to bias said tubes normally to cut-off, and said positive terminal being connected to each of said responsive devices to supply anode potential to said tubes, a circuit receptive of start pulses coupled to the input circuit of the first tube in the cascaded series, and a capacitor directly coupling the output circuit of each tube to the input circuit of the succeeding tube in the cascaded series thereby to cause said tubes to be activated progressively to control the flow of current in the output circuits thereof when said tubes are rendered conductive by nullification of the cut-off bias in their input circuits to subject the associated responsive devices progressively to control of signals applied to said control electrode means.

13. An electronic distributor for use in applying successive code elements of a train of signals to responsive devices, said distributor comprising a plurality of discharge tubes each having a control grid and each having its space path connected in series with a responsive device and with a common source of operating potential, a concatenated series of discharge tubes constituting individual control means for sequentially applying cut-off bias for each of the tubes of said series, means for causing each of the tubes of said series to be normally biased to cut-off, each of the tubes of said concatenated series having an input circuit with predetermined asymmetrical time-constant characteristics and an output circuit, a capacitor coupling each output circuit to the input circuit of a succeeding tube up to the final tube of the series, means to apply signals to the control grids of the tubes in the group first mentioned, whereby each of said tubes is caused to be conductive whenever a positive signal pulse is applied to its grid during the application of cut-off bias therefrom by the operation of the tubes of said concatenated series.

14. An electronic distributor circuit arrangement, including a plurality of cascaded electron discharge tubes each having a grounded cathode, an anode and a control grid, input and output circuits for each of said tubes, individual responsive devices connected to the anodes of each of said tubes, means to apply a direct potential source having a ground connection intermediate the negative and positive terminals thereof to said cascaded tubes, said negative terminal being resistively connected to said input circuit of each of said tubes to bias said tubes normally to cut off, and said positive terminal being connected to each of said responsive devices to supply anode potential to said tubes, a capacitor directly coupling the output circuit of each tube to the input circuit of the succeeding tube in the cascaded series, a circuit receptive of start pulses coupled to the input circuit of the first tube in the cascaded series, thereby to cause said tubes to be activated progressively to control the flow of current in the output circuits thereof when said tubes are rendered conductive by nullification of the cut-off bias from their input circuits to subject the associated responsive device progressively to control of signal applied to said control grids.

EUGENE R. SHENK.

REFERENCES CITED

The following references are of record in the file of this patent:

UNITED STATES PATENTS

| Number | Name | Date |
|---|---|---|
| 2,099,065 | Holden | Nov. 16, 1937 |
| 2,210,574 | Fitch | Aug. 8, 1940 |
| 2,313,906 | Wendt | Mar. 16, 1943 |
| 2,447,799 | Dickinson | Aug. 24, 1948 |